(12) United States Patent
Kollmitzer (10) Patent No.: US 7,792,288 B2
(45) Date of Patent: Sep. 7, 2010

(54) COMMUNICATION SYSTEM USING QUANTUM CRYPTOGRAPHY AND COMPRISING SWITCHING STATIONS

(75) Inventor: Christian Kollmitzer, Klagenfurt (AT)

(73) Assignee: ARC Seibersdorf Research GmbH, Vienna (AT)

( * ) Notice: Subject to any disclaimer, the term of this patent is extended or adjusted under 35 U.S.C. 154(b) by 1416 days.

(21) Appl. No.: 10/535,363

(22) PCT Filed: Nov. 21, 2003

(86) PCT No.: PCT/AT03/00351
§ 371 (c)(1), (2), (4) Date: May 18, 2005

(87) PCT Pub. No.: WO2004/049623
PCT Pub. Date: Jun. 10, 2004

(65) Prior Publication Data
US 2006/0013396 A1 Jan. 19, 2006

(30) Foreign Application Priority Data
Nov. 22, 2002 (AT) .............................. A 1755/2002

(51) Int. Cl.
H04L 9/28 (2006.01)
H04L 9/08 (2006.01)
H04L 29/06 (2006.01)
H04K 1/00 (2006.01)
(52) U.S. Cl. .................. 380/44; 380/256; 380/283; 713/150
(58) Field of Classification Search ............ 380/44, 380/256, 283; 713/150
See application file for complete search history.

(56) References Cited

U.S. PATENT DOCUMENTS

| 5,142,578 | A * | 8/1992 | Matyas et al. ............... 380/280 |
| 5,850,441 | A * | 12/1998 | Townsend et al. ........... 380/283 |
| 6,895,091 | B1 * | 5/2005 | Elliott et al. ................ 380/278 |
| 7,068,790 | B1 * | 6/2006 | Elliott ........................ 380/278 |
| 7,324,647 | B1 * | 1/2008 | Elliott ........................ 380/278 |
| 7,457,416 | B1 * | 11/2008 | Elliott ........................ 380/256 |
| 2001/0055389 | A1 * | 12/2001 | Hughes et al. ................ 380/44 |
| 2003/0002674 | A1 * | 1/2003 | Nambu et al. ............... 380/256 |
| 2004/0005061 | A1 * | 1/2004 | Buer et al. .................. 380/282 |
| 2007/0140495 | A1 * | 6/2007 | Berzanskis et al. .......... 380/278 |

OTHER PUBLICATIONS

Menezes, Alfred et al. "Handbook of Applied Cryptography", CRC press 1997, p. 553.*
Elliott, "Building the quantum network," *New Journal of Physics*, 4:46.1-46.12, 2002.
Gisin et al., "Quantum cryptography," *Rev. Of Mod. Physics*, 741-50, 2002.
Karlsson et al., "Quantum Cryptography-from single-photon transmission, key extraction methods to novel quantum information protocols," *Evolutionary Computation*, CEC99, Proceedings fo the 1999 Congress, 3: 2247-2254, 1999.

* cited by examiner

*Primary Examiner*—Michael Pyzocha
(74) *Attorney, Agent, or Firm*—Fulbright & Jaworski L.L.P.

(57) ABSTRACT

A communication system using quantum cryptography, comprising subscriber stations (1.*i*, 2.*i*) which are connected to quantum channels (3) and quantum-cryptographic devices (10, 11) which are associated with the quantum channels for generating a quantum key, wherein several interconnected switching stations (1, 2) are provided to which the subscriber stations (1,*i*, 2.*i*) are connected via the quantum channels (3) in order to generate a respective temporary quantum key.

9 Claims, 11 Drawing Sheets

COMMUNICATION SYSTEM USING QUANTUM CRYPTOGRAPHY AND COMPRISING SWITCHING STATIONS

This application is a national phase application under 35 U.S.C. §371 of International Application No. PCT/AT2003/000351 filed 21 Nov. 2003, which claims priority to Austrian Application No. A 1755/2002 filed 22 Nov. 2002. The entire text of each of the above-referenced disclosures is specifically incorporated herein by reference without disclaimer.

The invention relates to a communication system using quantum cryptography, comprising subscriber stations which are connected to quantum channels and quantum-cryptographic devices which are associated with the quantum channels for generating a quantum key.

Quantum cryptography employs quantum-physical effects so as to generate a more or less interception-safe key between communication partners, cf. e.g., N. Gisin, G. Ribordy, W. Tittel, H. Zbinden, "Quantum Cryptography", Reviews of Modern Physics, Vol. 74, January 2002, pp. 145-195, or A. Karlsson et al., "Quantum Cryptography-From Single-Photon Transmission, Key Extraction Methods to Novel Quantum Information Protocols", Evolutionary Computation, 1999; CEC 99; Proceedings of the 1999 Congress, Vol. 3, 6-9, July 1999, pp. 2247-2254. In detail, in the case of quantum cryptography, photons containing quantum information are exchanged between two partners. The two partners measure certain properties of these photons, such as, e.g., the plane of polarization, obtain the same measurement results and therefore can construct an identical quantum key. In doing so, parts of the measurement results, such as, e.g., the exact points of time, are exchanged via public channels. In this manner, the two partners are capable of exactly associating the individual measurements to each other.

In principle, there exist two methods for this, i.e. one using single photons and another one using interlaced photons. In case of the single photon method, a partner generates a sequence of single photons which are sent through a polarizer having a plane of polarization which is varied at random. The setting of the polarizer is transmitted to the other partner. If then a photon is registered by this other partner, also its plane of polarization is clearly determined. However, with this method it must be ensured that in fact only one single photon each is generated, since in case of several photons of the same polarization, a photon could be intercepted by a third party.

With the method of interlaced photons, two photons containing the same quantum information are generated simultaneously by a special technique. One photon each is sent to one of the two partners so that the two partners simultaneously will receive an identical measurement result and thus, each can construct the same quantum key for him/herself.

When generating the quantum key, the photons can be exchanged e.g. via a fiberglass connection, or also via a direct visual communication between two telescopes etc. Set-ups used so far have employed these fiberglass connections or direct visual connections for communication purposes employing the quantum cryptography described. In doing so, it is a disadvantage that the connections can be set up only over relatively short distances, e.g. only a few kilometers, for enabling the transmission of the photons, so that the use of the quantum cryptography so far has been restricted to partner stations of short distances only. Moreover, the devices for the fiberglass connection or free space (line of sight) connection are also relatively expensive, and it would be desirable to be able to use known low-cost connections, in particular devices which already exist, for the encoded communication.

Therefore, it is an object of the invention to provide a technique by which the described secure quantum key can be generated and utilized in a rational manner, wherein, however, later on large transmission ranges are possible and, moreover, low-cost public lines can be used for communication—yet without negatively affecting the security achieved by quantum cryptography. In doing so, the communication shall not be bound to certain cryptographic algorithms, and it shall be possible to supplement or replace, respectively, cryptographic algorithms in an existing system at any time.

The communication system according to the invention and of the initially defined type is characterized in that several interconnected switching stations are provided to which the subscriber stations are connected via the quantum channels for generating a respective temporary quantum key.

In the technique according to the invention it is not necessary that the two communication partners each directly exchange a secure key, much rather one quantum key each is generated between a communication partner—i.e. a subscriber station—and a switching station, a "site of trust". Each switching station thus can have an associated zone in which associated subscriber stations are present which are connected to the associated switching station via comparatively short quantum channels (e.g. the previously mentioned fiberglass lines or free space connections with telescopes). The switching stations then are interconnected via conventional channels which are designed to be secure against eavesdropping in any manner known per se, such as by encryptions agreed upon. By the fact that now the subscriber stations, or communication partners, respectively, no longer need exchange keys directly via a secure channel, also subscriber stations which are very remote from each other will be able to communicate with each other with the high degree of security ensured by quantum cryptography, using public connecting lines. For such a communication, substantially three steps are required, i.e. first, the request from a first subscriber station for establishing the communication; then, secondly, the set-up of the secure communication, generating the quantum key; and, thirdly, the actual communication between the subscriber stations using the quantum key previously generated.

In the technique according to the invention, it is also particularly advantageous that the subscriber stations can be equipped with relatively simple quantum-cryptographic devices, whereas the complex devices can be concentrated in the switching stations. Accordingly, it is advantageous if the switching stations contain a source of photons as quantum-cryptographic device as well as also a photon detector, in case interlaced photons are used. On the other hand, the subscriber stations may merely contain a photon detection device. Thus, the photon source will only be present at the switching stations, and at the subscriber stations the technical means for detecting the photons will suffice.

As has been mentioned, always a separate quantum key is generated between the subscriber stations (communication partners) and their associated switching station. If both subscriber stations were connected to one and the same switching station via their quantum channels, with the technique according to the invention, the two quantum keys nevertheless also will be generated independently of each other, even if this basically were not required, for instance when using interlaced photons. In this manner, always the same protocols and the same methods can be used for error correction.

The switching stations can be interconnected in a manner known per se in switching technique, at least partially in the form of point-to-point links, or also in the form of a hierarchy.

With the technique according to the invention it is advantageous that the quantum channels need only be used in the course of generating the quantum keys, and as soon as the quantum keys have been generated, the communication partners can also communicate with each other in a conventional manner. Accordingly, it is suitable if the subscriber stations communicate via public lines, using the quantum key generated via the switching stations. In this manner, the quantum lines, or quantum channels, respectively, which as such are very expensive, are kept free and utilized for the quantum key generation only, and for the subsequent communication, using the quantum keys, conventional lines, or channels, respectively, can be used, such as telephone lines, radio links or the like links.

As has previously been mentioned, it is preferably provided for a quantum key to be generated between each subscriber station and the associated switching station, and accordingly, a preferred embodiment of the communication system according to the invention provides for the subscriber stations engaged in the desired communication to generate a separate—respective first or second—key bit sequence with their associated switching station via the quantum channel after a request for a communication has been transmitted via the respective switching station. Here, it is further suitable if the switching station associated with the called subscriber station generates a third key bit sequence from the key bit sequences generated via the quantum channels, and transmits this third key bit sequence to the called subscriber station which, using its known second key bit sequence generated by it with the associated switching station, from the third key bit sequence generates the—on the side of the calling subscriber station—first—key bit sequence which then finally is used as a mutual key for the communication between the subscriber stations.

For security reasons, it is furthermore preferably to be provided that when ending the communication, the quantum key generated for this communication is discarded.

It has been known that when measuring the photon properties, the information of the respective photon is destroyed. Therefore, if an unauthorized third party intercepts information by measurement, it is thus prevented that the authorized communication partner will receive the correct information. By comparing parts of the measurement between the two authorized communication partners, it can therefore undoubtedly be determined whether or not a non-authorized third party has been intercepting. Therefore, according to the invention it is particularly suitable if the quantum key generated is checked for its freedom from interference, and if, as a consequence of a possible interference detected which is associated with an eavesdropping, the established communication is disrupted and the key is discarded.

As has already been mentioned, the stationarily set-up switching stations can communicate with each other via conventional, in particular public lines, using the encryption agreed upon.

Finally, for security reasons as well as for checking the authorizations, it may advantageously be provided that prior to the establishment of a communication between subscriber stations, data transmitted from the latter to the respective switching station and specific for them, such as, e.g., authentication data, are checked by the respective switching station.

In the following, the invention will be explained in more detail by way of particularly preferred exemplary embodiments to which, however, it shall not be restricted, and with reference to the accompanying drawings. In detail, in the drawings, FIG. 1 schematically shows the set-up of an inventive system with switching stations and respective associated subscriber stations.

Figure 1:
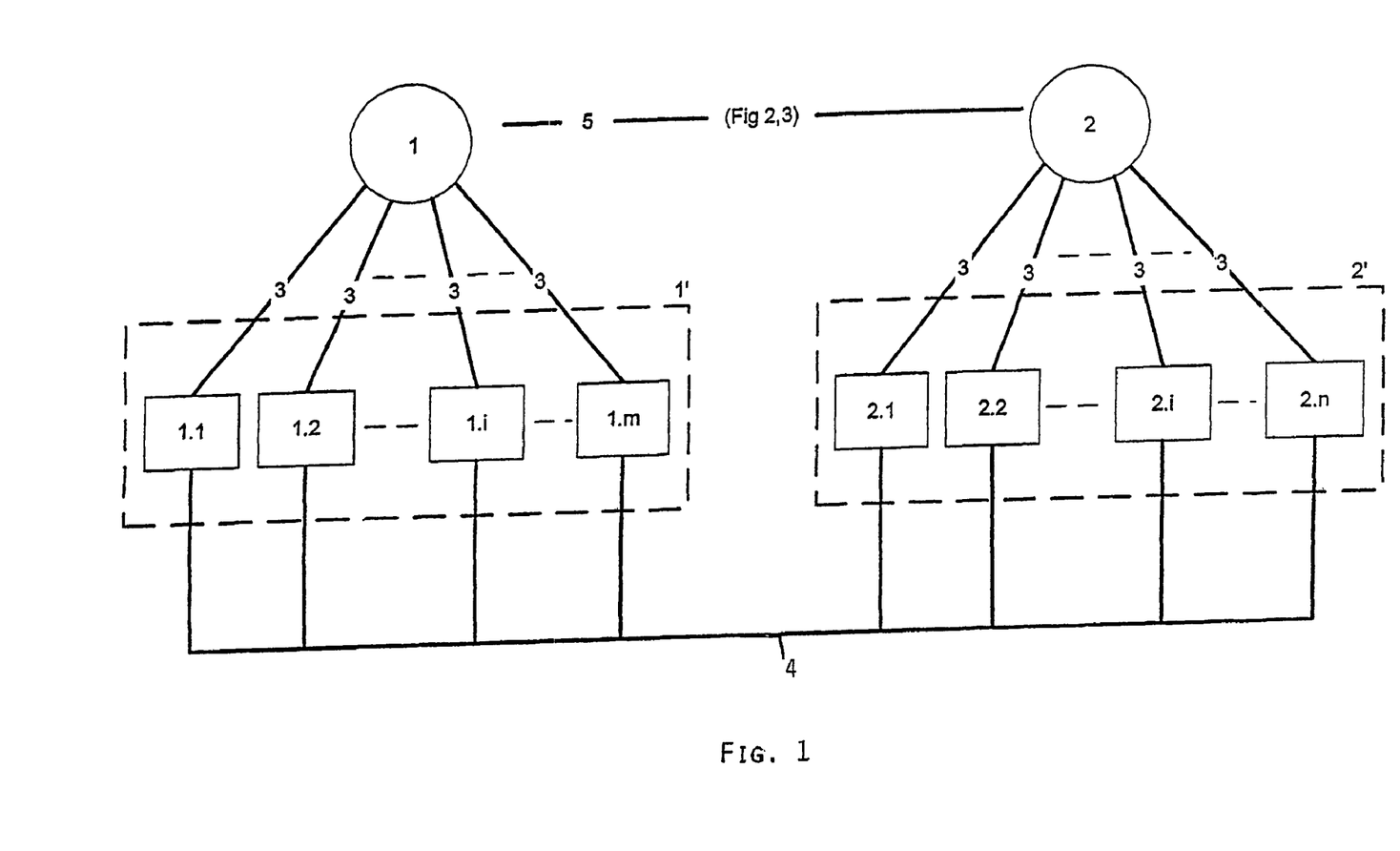

In FIG. 1, a communication system including fixed switching stations 1, 2 . . . is shown schematically, wherein one or more subscriber stations are connected to each switching station 1, 2, e.g. the subscriber stations 1.1, 1.2, . . . , 1.*i* . . . , 1.*m* are connected to the switching station 1, and the subscriber stations 2.1, 2.2, . . . , 2.*i*, . . . , 2.*n* are connected to the switching station 2, via quantum channels 3. (By "quantum channel" as such the combination both of the line required for the quantum cryptography for exchanging photons and of a public line is to be understood.) Moreover, the subscriber stations 1.*i*, 2.*i*, . . . are interconnected via public lines 4. The switching stations 1, 2 . . . may be interconnected in various ways, as will be explained in more detail hereinafter by way of FIGS. 2 and 3. It is, of course, also conceivable that only one fixed subscriber station is connected to a switching station 1, 2 via a quantum channel or a quantum line 3, respectively, and the respective connected subscriber stations form a node zone or "trust zone" 1', or 2', respectively, associated with the respective switching station 1, 2. Via the quantum channels 3, the quantum keys required for the respective secure communication are generated in common by the respective subscriber station and the associated switching station, and the subsequent communication using this quantum key takes place via the public lines 4. Thus, the switching stations 1, 2 have the function of generating the secure quantum key together with the subscriber stations 1.*i*, 2.*i*, and to ensure the presence of one and the same key on both communication sides, i.e. at both subscriber stations engaged in a communication with each other. The switching stations 1, 2 ... are interconnected via public lines, dedicated lines or the like channels 5, an encryption, however, being provided for the communication between the switching stations 1, 2 to thus make the information exchange during the key generation secure also from this side. Thus, the switching stations 1, 2 form "points of trust", wherein the switching stations 1, 2 communicating with each other—depending on the architecture—must have exchanged a key.

Figure 2:
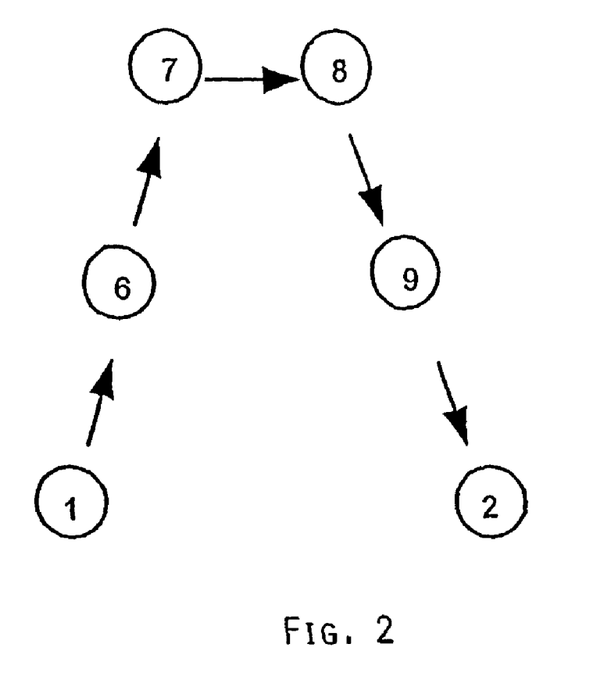
FIG. 2 shows a hierarchical model for interconnecting the individual switching stations.
Figure 3:
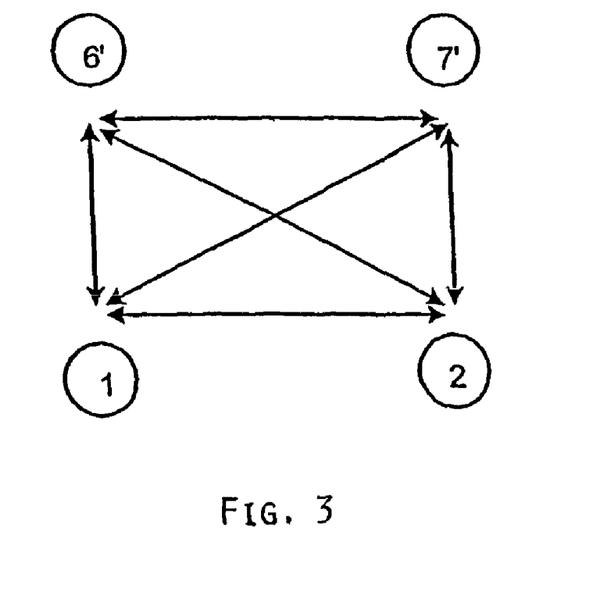
FIG. 3 shows a node-to-node model for connecting the switching stations, as an alternative to FIG. 2.

The set-up of the network with the switching stations 1, 2 can be provided in different, per se conventional, ways, two possibilities being illustrated as examples in FIGS. 2 and 3. In FIG. 2, a hierarchical model is shown, wherein the connection between the two switching stations 1, 2 (cf. also FIG. 1) is effected via a hierarchical structure, at first ascending, then descending again, via switching stations 6, 7, 8, 9.

According to FIG. 3, each of the switching stations 1, 2, 6', 7' shown there can directly communicate with each other, i.e. this is a so-called point-to-point model. However, the concrete way of the connection between the switching stations 1, 2 is of no further relevance for the function of the present communication system using quantum cryptography. It is only essential that for providing a secure, quantum cryptographically encoded communication between subscriber stations 1.*i*, 2.*i*, such switching stations 1, 2 are involved, with these switching stations 1, 2 being interconnected in a secure way so that the key bit sequences (so-called streams), required for generating the key on the side of both subscriber stations involved in a communication, can be exchanged via the quantum channels 3 which, due to the technical circumstances necessarily are short, and via the switching stations 1, 2 etc.; with a view to this, the subscriber stations 1.*i*, 2.*i* may also be provided at arbitrary, large distances from each other. With this, a communication employing quantum cryptography is enabled between subscriber stations 1.*i*, 2.*i* very far from each other, i.e. without being restricted to the short distances as hitherto required by the quantum channels 3 given by optical fiber lines or by line of sight connections realized by means of a telescope.

Figure 4:
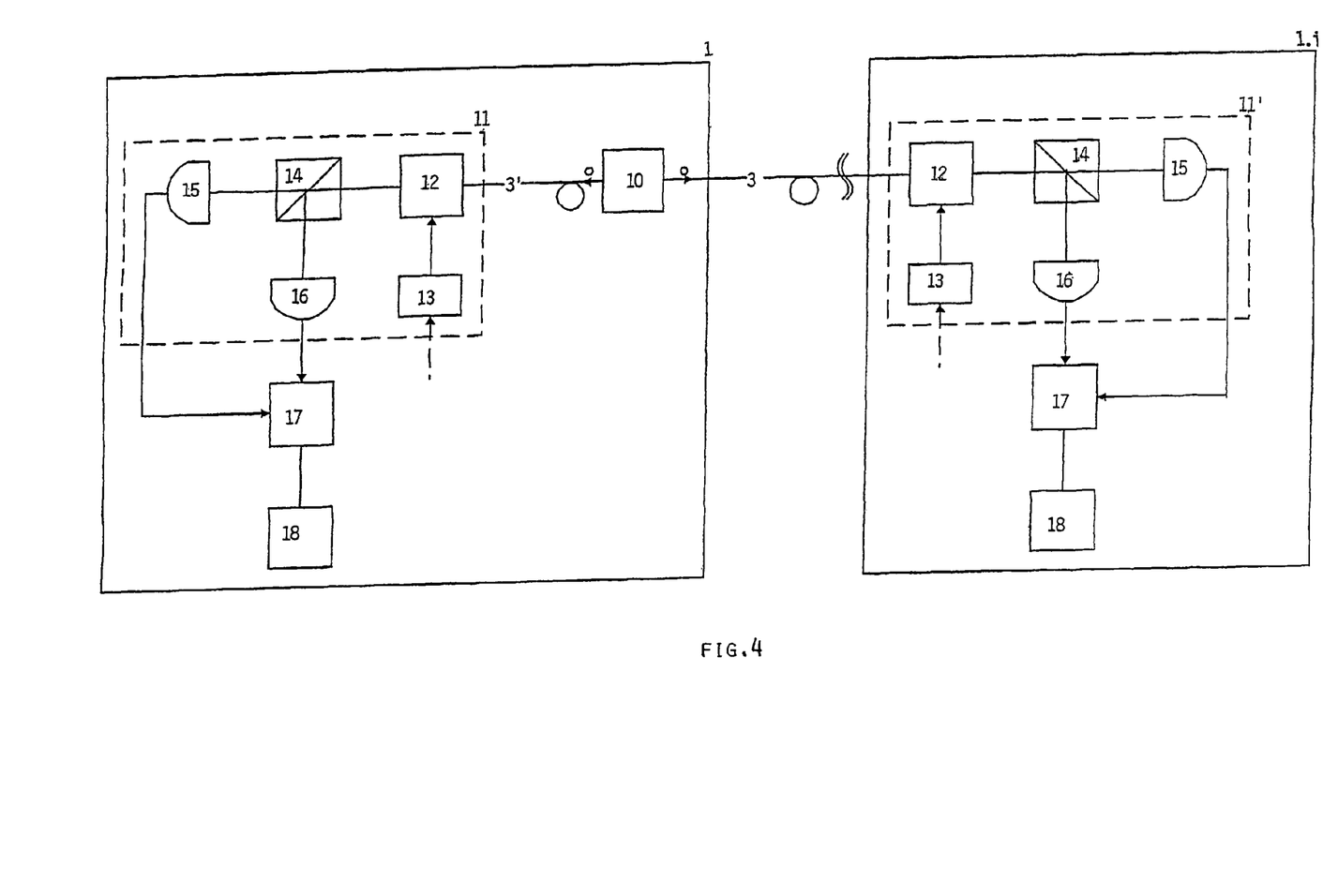
FIG. 4 schematically shows the essential quantum cryptographic devices in a switching station and in a subscriber station, respectively, in a type of block diagram, here for the instance of producing interlaced photons.

For a better understanding, the principle of quantum cryptography known per se shall be explained in short by way of FIG. 4. Due to the particular "randomness" of certain properties of photons used therein, quantum cryptography is highly secure. In quantum cryptography, photons comprising quantum information are exchanged between two partners. Both partners measure certain properties of these photons (e.g. the plane of polarization), obtain the same measurement results, and therefore are able to build up an identical key. In doing so, parts of the measurement results—e.g., the exact points of time—are exchanged via public channels. By this, both partners are able to exactly associate the individual measurements.

By the measurement, the information of the single photon is destroyed, therefore always only one recipient of a photon can carry out the measurement. On account of the laws of quantum physics, photons having defined properties cannot be artificially produced. A third partner who intercepts the information by measurement will thus prevent the authorized partner from receiving the correct information. Therefore, by comparing parts of the measurement between the two authorized communication partners it can unambiguously be determined whether or not a third party has been intercepting.

In principle, it is distinguished between two methods:

(1) Single photons: A partner generates a sequence of single photons which he sends through a polarizer whose plane of polarization is randomly varied. The setting of the polarizer is transmitted. If a photon is registered by the other partner, its plane of polarization thus is clearly determined. It must, however, be ensured that in fact only a single photon is generated, because in case of several photons of the same polarization, one of the photons could be intercepted by a third party.

(2) Interlaced photons (so-called "qubits"): By special methods, two photons are produced simultaneously which contain the same quantum information. Each photon is sent to one of the two partners so that the partners simultaneously receive the identical measurement result and thus can build up an identical key.

In classical quantum cryptography, it is assumed that photons are exchanged between the two communication partners. These photons are derived from a source which—depending on the method chosen, is either directly arranged at one of the two communication partners (single photon method) or between the two partners (interlaced photons).

Within the scope of the invention, it is sufficient that the source of photons is only installed at one of the two communication partners, i.e. in particular at the switching station, e.g. 1. Thus, in the switching station 1 both the source of photons and when using qubits—also a photon detector is present. In the subscriber station, e.g. 1.*i*, then merely the technical prerequisites for detecting the photons are necessary.

Accordingly, in FIG. 4 the switching station 1 is shown by way of example, which, as has been mentioned, is connected with associated subscriber stations, in particular the subscriber station 1.*i*, via a quantum channel 3, a source of photon pairs 10 being provided in the switching station 1. Via an internal quantum line 3', this photon pair source 10 is further connected to a photon detector 11 within the switching station 1; a correspondingly designed detector 11' is present in the subscriber station 1.*i*, and subsequently always one detector, 11 e.g., will be explained with reference to components 12 to 18 which have the same reference numbers for both detectors 11, 11'.

The detector, 11, e.g., comprises an active polarizer 12 on its input side, to which an appropriate adjustment signal is supplied via a control unit 13. Then the photon gets to a polarizing beam divider 14 which is followed by two avalanche photodiodes 15, 16 to the outputs of which an analyzing unit 17, e.g. a time interval analyzer, is connected. Besides, the further common communications control units are comprised together with a circuit module 18.

The photon pair source 10 may be set up in conventional manner with a pump beam laser, the pump beam being supplied to a non-linear crystal, e.g. a barium borate crystal ("BBO crystal"), the interlaced photons or "qubits" being produced by this laser irradiation.

As has been mentioned, always a separate key is generated between a switching station, e.g. 1, and an associated subscriber station, e.g. 1.1, this being so even if two subscriber stations, e.g. 1.1 and 1.2, are associated to one and the same switching station, e.g. 1. As such, this would not be necessary when using the method of the interlaced photons, yet whenever the two keys are generated independently of each other, also the same protocols and the same methods for error correction can be employed.

As further mentioned, in the present communications system it is no longer necessary for the intercommunicating subscriber stations to previously exchange a key via a secure channel (quantum channel), this will much rather be effected by involving the respective associated switching station, with the switching station—in combination with the quantum key generated—ensuring the high degree of security during the communication. Before a communication is established between two subscriber stations, e.g. 1.1 and 2.1 (cf. FIG. 1 and FIGS. 5A and 5B, respectively, as well as FIG. 6), or between two subscriber stations 1.1 and 1.2 associated to one and the same switching station, e.g. 1 (cf. FIGS. 7A, 7B and 8), a request for establishing the communication is made, wherein one subscriber station, e.g. 1.1, triggers this phase by a respective request; subsequently, a secure communication is established, and finally, the actual communication by using the quantum key generated.

In the following, the individual steps when a subscriber station, e.g. 1.1, requests the establishment of a communication with another subscriber station, e.g. 2.1 or 1.2, as well as the establishment of the secure communication will now be explained in more detail. In the individual switching stations, information regarding the connections depending on the concept of the communications system may be stored, yet in the switching stations, all the generated key bit sequences (streams) should be deleted after the secure communication has been established and before the direct communication between the subscriber stations using the generated key is carried out. In the communication taking place using the key generated, various algorithms, such as from the fields of the block and current chiffres, may be resorted to. In any event, also in the subscriber stations, the key generated for the communication should be discarded immediately after ending this communication and should not be used any longer. It must not be stored in the system, and, apart from the communications partners, it must not be made accessible to anyone.

Figure 5A:
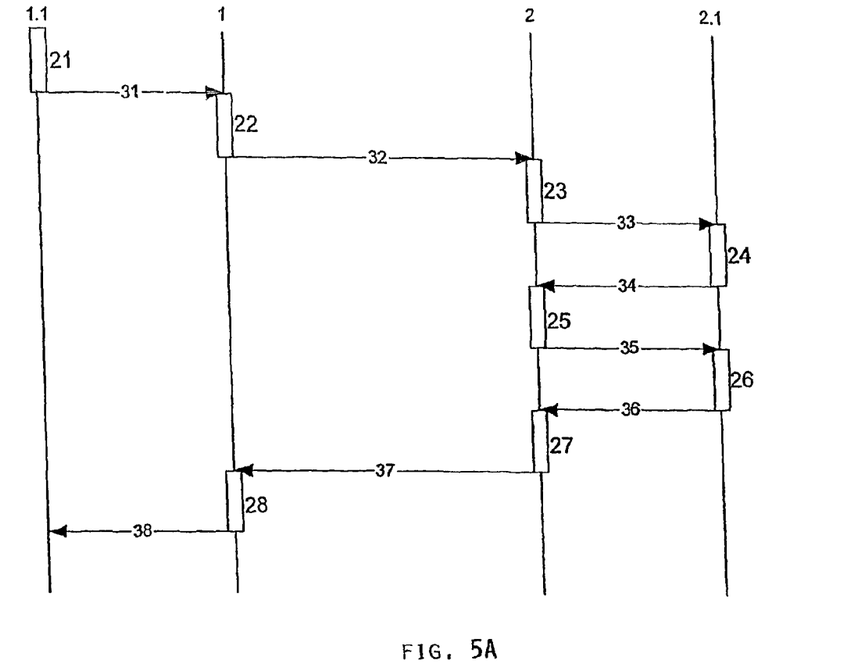
FIG. 5A shows a diagram for illustrating the sequence in case of a request for setting up a communication through a subscriber station, a resource-oriented set-up being made here.

In FIG. 5A, a diagram is shown to illustrate the procedures when requesting the establishment of a communication, this being based on a resource-oriented set-up, in detail. In contrast to a speed-oriented set-up (as will be explained hereinafter by way of FIG. 5B), in such a resource-oriented set-up all the partial steps are started by the "calling" subscriber station, e.g. 1.1, so that more communication steps have to be carried out than with the speed-oriented set-up. Yet it is possible to react to the answer of the partner, i.e. of the called subscriber station, e.g. 2.1, after transmission of the wish for a communication, and only then to initiate the resource-intensive set-up of the secure communication.

To simplify matters, the subscriber stations will simply be termed "subscriber" hereinafter, and that subscriber station from which a request emanates, is also termed "initiator" or "party calling subscriber", whereas the called subscriber station will be termed "target station".

According to FIG. 5A, the subscriber station 1.1 associated with the switching station 1 desires a communication with the subscriber station 2.1 associated with the switching station 2. The designation of the subscriber stations and switching stations is to be understood without restricting its generality.

In FIG. 5A, just as in the subsequent FIGS. 5B to 8, the vertical blocks generally indicate communication steps (in FIG. 5A, communication steps 21 to 28), and the horizontal arrows between the individual stations 1.1, 1, 2, 2.1 indicate data transmissions (in FIG. 5A, data transmissions 31 to 38). In the course of the illustrated request for an establishment of a communication, the calling subscriber 1.1 according to block 21 first sends a request to its associated switching station 1, the data transmission according to arrow 31 containing his identification as well as the desired partner (target station 2.1). According to block 22, the switching station 1 then checks the data received from initiator 1.1 (e.g. with regard to authentication, authorization, account information etc.) and in case of a positive result of this check, it further transmits the request to the switching station 2 responsible for the called subscriber 2.1 (which may be done directly as previously explained by way of FIGS. 2 and 3, or via other switching stations). The data transmitted according to arrow 32 mainly indicate the desired subscriber 2.1 as well as also the calling subscriber 1.1.

According to block 23, the switching station 2 then requests its associated called subscriber 2.1 to communicate, transmitting a request for identification according to arrow 33, to which the called subscriber 2.1 responds according to block 24 and by transmitting his data back to the switching station 2 according to arrow 34. According to block 25, the switching station 2 then checks the data of the called subscriber 2.1 (regarding authentication, authorization, account information etc.) and, if the result of the check is positive, it transmits the respective information regarding the desired communication to the called subscriber 2.1, cf. request arrow 35 in FIG. 5A. This information particularly contains data relating to the calling subscriber 1.1. According to block 26, the called subscriber 2.1 then positively confirms the request, and according to arrow 36, as an answer, he returns this confirmation, including a request to communicate, to the switching station 2 which in turn—cf. block 27—transmits the answer to the switching station 1, cf. also arrow 37; according to block 28, the switching station 1 then transmits this answer to the calling subscriber 1.1. cf. also the data transmission according to arrow 38.

Now the establishment proper of the secure communication can occur by generating the quantum key for the communications session, and this will be explained in the following in more detail by way of FIG. 6. Yet before this, that case will be described by way of FIG. 5B, in which a request is made for a speed-oriented establishment of a communication.

Figure 5B:
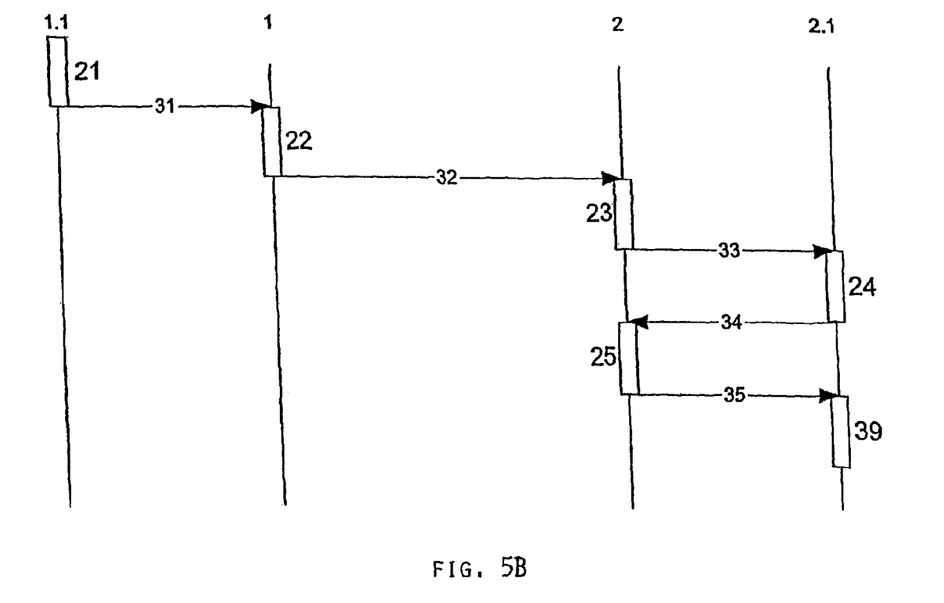
FIG. 5B shows a diagram for the sequence in case of a request for a speed-oriented communication set-up, as an alternative to FIG. 5A.

In contrast to the resource-oriented approach, in case of the speed-oriented communication set-up following the request to communicate, the answer of the target station 2.1 is not directly returned to the initiator 1.1, much rather the target station 2.1, answering to the request, takes up the active role in the establishment of the secure communication, wherein the number of the individual steps required can be reduced and the communication establishment can be accelerated.

In the associated diagram according to FIG. 5B, the communication steps 21 to 25 corresponding to the procedure according to FIG. 5A are designated with the same reference numbers, and likewise the corresponding data transmissions are indicated by the arrows 31 to 35. In view of the explanations given with regard to FIG. 5A, these steps and the data transmission, respectively, need not be discussed again. Other than in the procedure according to FIG. 5A, after communicating the data of the requesting subscriber 1.1 according to the data transmission, arrow 35, in the diagram of FIG. 5B it results now that the subscriber station 2.1 called positively confirms the request according to block 39 and—instead of the calling subscriber 1.1—the subscriber station 2.1 itself directly assumes the active role in the subsequent establishment of the secure communication.

Figure 6:
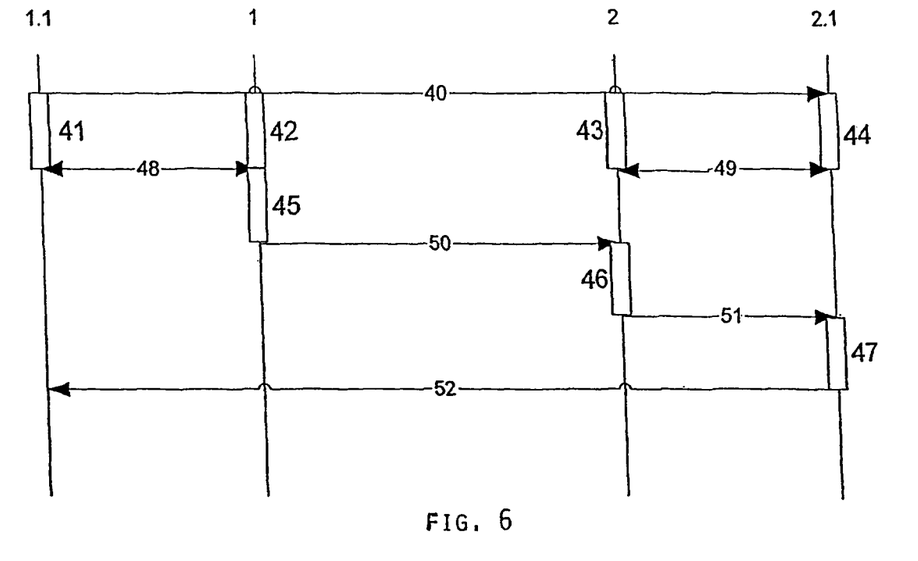
FIG. 6 shows a diagram for illustrating the set-up of the secure communication in case of the communication requirements according to FIGS. 5A and 5B, respectively.

The set-up of the secure communication is schematically illustrated in FIG. 6, this set-up being respectively true for both aforementioned variants (resource-oriented and speed-oriented communication set-up).

As previously explained, the request for a communication establishment is schematically illustrated in FIG. 6 by the continuous arrow 40.

Blocks 41 to 47 then again denote the communications steps which will be explained in more detail hereinafter, and the arrows and double arrows 48 to 52 denote the concrete data transmissions, i.e. particularly the transmissions of key bit sequences ("streams").

In detail, according to block 41, the calling subscriber 1.1 is ready to communicate, and together with the switching station 1, he generates the first key bit sequence 48 (stream 1) via the associated quantum line 3 (cf. FIG. 1), cf. also block 42 which illustrates the key bit sequence generation on the side of the switching station 1. The first key bit sequence 48 is generated on the basis of quantum mechanisms, as has been described.

Independently thereof, according to blocks 43 and 44 as well as to the double arrow 49, a second key bit sequence (double arrow 49), a so-called stream 2, is likewise generated between the other switching station 2 and the called subscriber 2.1 on the basis of quantum mechanisms and via the quantum line 3 provided there.

According to block 45, the first switching station 1, by means of a method agreed upon between the switching stations 1,2, encodes the first key bit sequence and transmits it in encoded form to the second switching station 2, cf. also arrow 50, which illustrates this transmission of the encoded first key bit sequence. From the encoded first bit sequence as well as from the second key bit sequence (double arrow 49), according to block 46, the second switching station 2 then generates a third key bit sequence (stream 3) which, according to arrow 51, is transmitted to the called subscriber 2.1. From the received third bit sequence 51 and the second key bit sequence already known to him (cf. arrow 49), the called subscriber 2.1 generates the first key bit sequence according to block 47 (cf. also arrow 48 in FIG. 6), and according to arrow 52, this first key bit sequence then is used as key, as so-called "session key", for the further communication together with the calling subscriber 1.1.

Figure 7A:
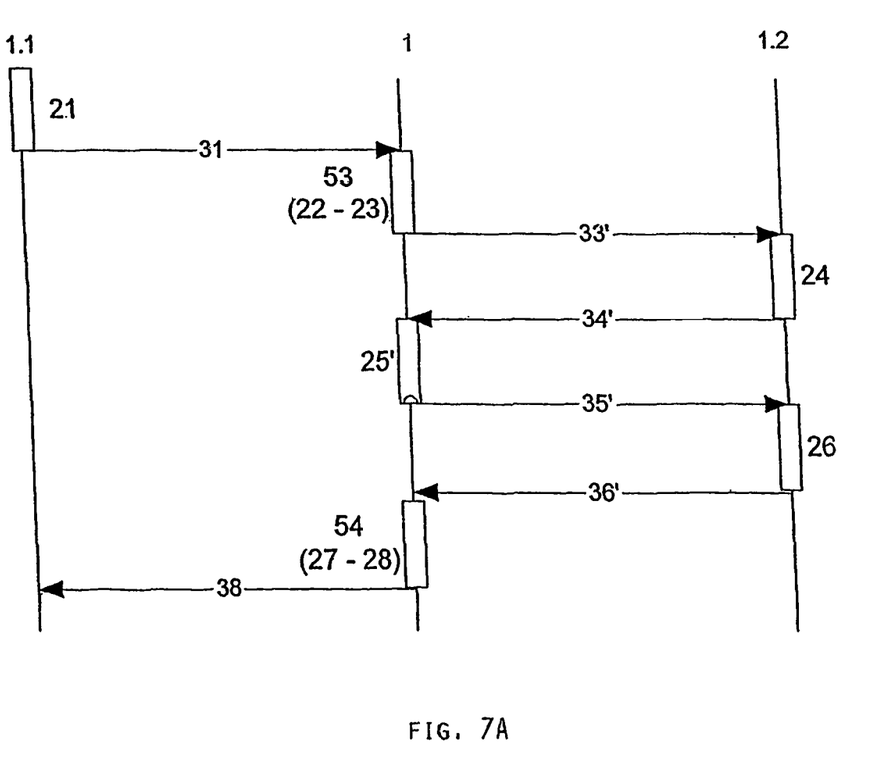
FIGS. 7A and 7B show in a manner corresponding to FIGS. 5A and 5B the situation in which the requesting subscriber station and the requested subscriber station are associated to one and the same switching station, and this once more for the case of the resource-oriented communication set up (FIG. 7A) and for the case of the speed-oriented communication set-up (FIG. 7B), respectively.
Figure 7B:
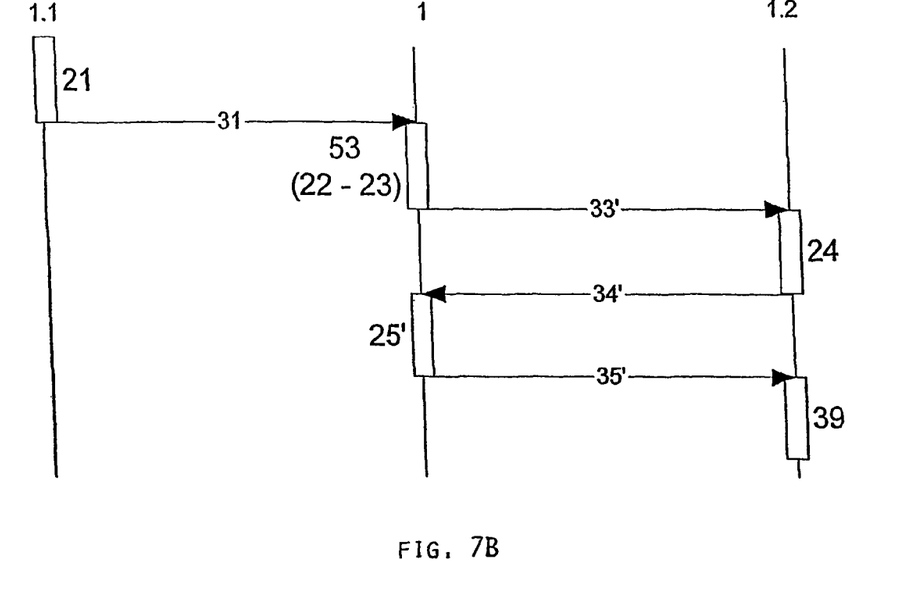

FIGS. 7A and 7B then illustrate the special case that both subscriber stations, i.e. the calling subscriber station 1.1. just like the called subscriber station 1.2, are associated to one and the same switching station 1. Again, reference is made to the two basic possibilities of the resource-oriented set-up (FIG. 7A), and the speed-oriented set-up (FIG. 7B); in FIG. 8, the set-up of the secure communication equally applicable to both cases is illustrated. Since, as has been mentioned, these are special cases of the diagrams according to FIGS. 5A, 5B and 6, corresponding reference numbers have again been used in FIGS. 7A, 7B and 8 for the corresponding communication steps and data transmissions, and, as far as they correspond to each other, a repeated description of these communications steps and data transmissions is not required. In detail, when comparing FIG. 7A with FIG. 5A, it appears that the two switching stations 1 and 2 according to FIG. 5A are to be combined to just one switching station 1, the data transmissions 32 and 37 being omitted and the communication steps 22, 23 on the one hand, and 27, 28, on the other hand, coinciding. In these communication steps or blocks, respectively, denoted respectively by 53 and 54, the switching station 1 checks—block 53—the data of the calling subscriber 1.1 (authentication, authorization, account information etc.) and requests the called subscriber 1.2 to directly communicate; according to block 54 (corresponding to blocks 27 and 28 in FIG. 5A), the switching station 1, after having received the confirmation and the request to communicate on the part of the called subscriber station 1.2 (cf. arrow 36'), transmits this answer directly to the called subscriber 1.1, cf. arrow 38.

Otherwise, the steps correspond to those according to FIG. 5A, as has been mentioned, thus rendering a renewed explanation unnecessary. Additionally, it should only be mentioned that the data transmissions in FIG. 7A due to the fact that they occur between the called subscriber 1.2 and the switching station 1 (instead of the switching station 2 in FIG. 5A), have been denoted by arrows 33' to 36' (instead of 33 to 36); correspondingly, also the checking step has been denoted by 25' (instead of 25).

Similarly, the above applies to the diagram according to FIG. 7B as compared to that according to FIG. 5B, wherein, however, in contrast to FIG. 7A, only the combined communications step 53—corresponding to steps 22, 23 in FIG. 5B—occurs, whereas as regards the set-up of the communication connection on the side of the called subscriber (cf. block 39) when compared to FIG. 7A, the combined step 54 is omitted.

Figure 8:
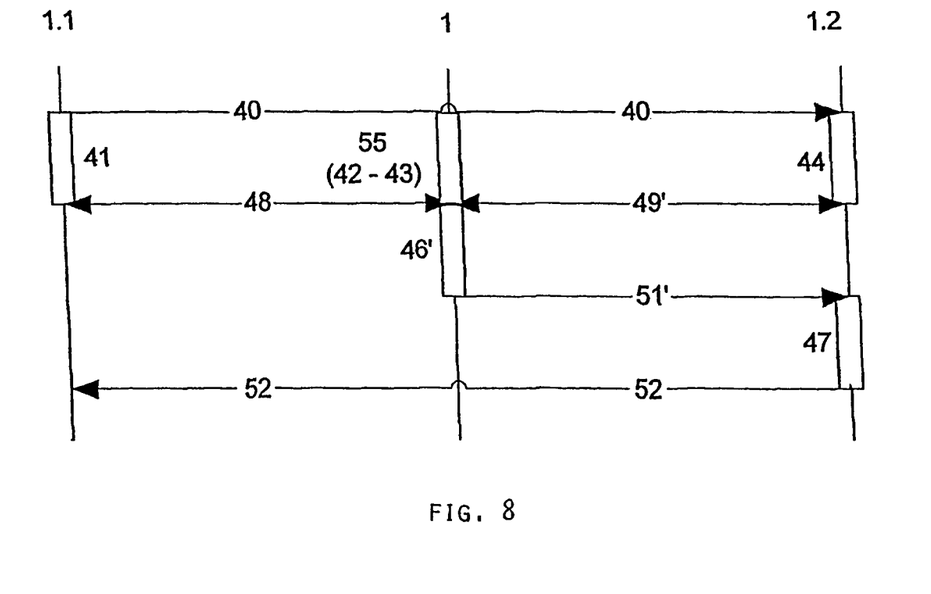
FIG. 8 shows a diagram pertaining to FIGS. 7A and 7B for illustrating the set-up of the secure communication between the two subscriber stations which here are connected to one and the same switching station.

Correspondingly, there results a simplification in the diagram according to FIG. 8 for the set-up of the secure communication, wherein, again, the two switching stations 1, 2 according to FIG. 6 coincide and, by way of example, the switching station 1 services both subscriber stations 1.1 and 1.2. In doing so, the steps 42, 43 according to FIG. 6 coincide to the combined step 55, according to which the switching station 1 is ready for communication and, independently of each other, with both subscriber stations 1.1 and 1.2 generates the quantum key bit sequences ("stream 1" and "stream 2") according to arrows 48 and 49'. By means of the apostrophe accompanying the reference numbers for the data transmissions 49, 51 and step 46, respectively, also here again it shall be indicated that comparable data transmissions and processes do occur, yet in connection with the other switching station than that of FIG. 6 (1 instead of 2).

In the following, by means of flow charts illustrated in FIGS. 9 and 10, and FIGS. 11 and 12, respectively, the mode of procedure used at a request for establishing a communication, and when establishing the secure communication, namely when incorporating two switching stations (FIGS. 9 and 10), and in case the two subscriber stations are associated to one and the same switching station (FIGS. 11 and 12), shall be explained in more detail by way of example. As has been mentioned, the subscriber stations are always associated to certain switching stations, and a quantum key is generated between one switching station each and a subscriber station. Normally, different switching stations will participate in the establishment of the communication and in the generation of the key, respectively, these switching stations in turn being interconnected either directly or via any network structure desired. In an exceptional instance, as has already been previously explained, the subscribers involved in the communication to be established are associated to one and the same switching station, i.e. arranged in one and the same "trust zone".

At the start of the procedure for establishing a communication connection, it must be checked whether it will be possible at all and whether it will be in the interest of the network provider and of the two subscribers to establish a connection between the subscribers. Thus, according to FIG. 9, after a starting step 56 at block 57, a request for communication is made by assembling the required data and preparing them in the form of a data package. Such a request for communication may, e.g., have the following contents:

Initiator: the identification of the initiator, e.g. 1.1, e.g. in the form of an unambiguous network address, comparable with addresses in other network protocols, such as IP.

Target station: identification of the called subscriber, e.g. 2.1, who is requested to communicate.

Time of the beginning of the communication: with this information, the desired point of time at which the communication is effected is set. Optionally, a token can be defined for an immediate communication establishment.

Conditions of the communication establishment: This information allows for the definition of tokens with regard to different properties of the communication. Examples of such tokens would be: carrier of the communication costs (initiator, target station, other account e.g. of an enterprise), responsibility for the data transmitted, priority of the communication, level of confidentiality, etc.

Figure 9:
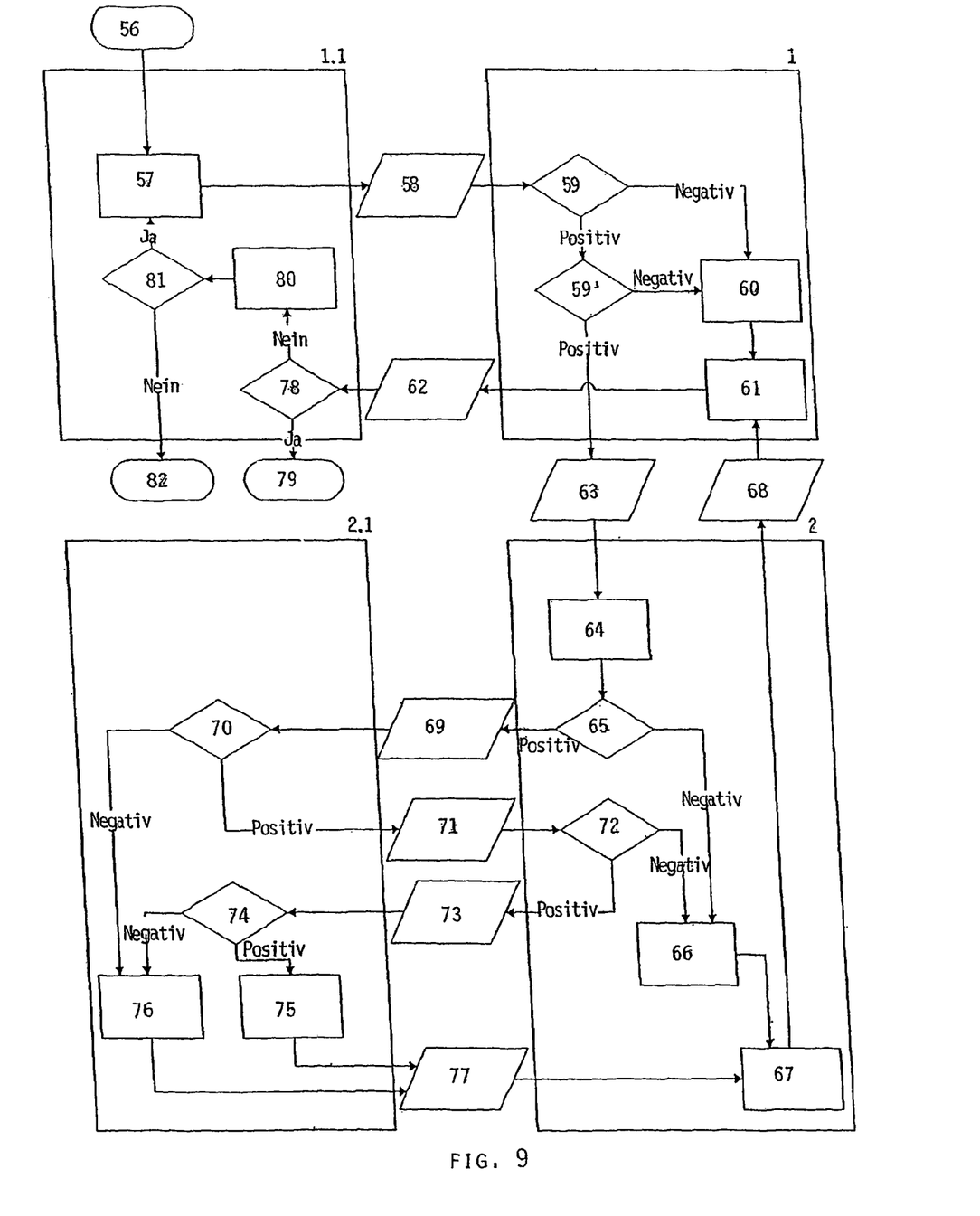
FIG. 9 shows a flow chart for illustrating the steps at a request for a communication set-up including two switching stations.

According to block 58 this request is transmitted to the pertinent switching station, e.g. 1, via a public line.

Incoming requests are checked by the respective switching station, i.e. here switching station 1. In particular, the data of the initiator 1.1 are checked, cf. block 59. Such a check could comprise the checking of various information, such as, e.g., the authentication of the initiator, the authorization of the initiator to communicate (with the target station, with this confidentiality level, at this point of time etc.), accounting information etc. According to block 60, a negative result of this check will lead to the discontinuation of the communication and to the generation of an appropriate response according to block 61, this response—according to block 62—being returned to the initiator 1.1.

In case of a positive result of the check at block 59, according to block 59' the information regarding the target station 2.1 will be checked. Here, the check could regard information like the following, for instance: availability of the target station, permission of the communication with the initiator, accounting information of the target station, confidentiality level of the communication, etc. If the check yields a negative result, the communication will be discontinued again (block 60), and a respective report will be transmitted to the initiator (blocks 61, 62).

Otherwise, the request will be transmitted to the switching station 2 in charge of the target station 2.1, cf. block 63 in FIG. 9. This switching station 2 can be reached in various ways. Examples of this would be a hierarchical organization of the individual switching stations (cf. FIG. 2), or via a direct connection between all the switching stations (cf. FIG. 3).

According to block 64, the request is received and processed by the switching station 2 associated with the target station 2.1. Within the scope of this processing, the data of the target station 2.1 are checked, cf. block 65, wherein, e.g., the accounting information of the target station 2.1 is checked, since this information may possibly only be known to the responsible switching station 2. Likewise, information regarding the degree of confidentiality or the circle of the allowed communication partners could be known to the responsible switching station 2 only, and therefore be checked only in this step, block 65. A negative result of the check will lead to a discontinuation of the communication, block 66, and to a respective report, cf. block 67, which, according to block 68, will be returned to the first switching station.

Optionally, at a positive check result, the target station 2.1 according to block 69 may be requested by the responsible switching station 2 for an authentication. At the same time, the target station 2.1 would be informed about the request for a communication. Here, all information of the request could be transmitted, yet optionally they could also be transmitted only after a successful identification, as illustrated in FIG. 9. In the case illustrated, the data required for the communication will be transmitted to the target station 2.1 only after a positive check of the identity so as to ensure a higher degree of security. According to FIG. 9, after the decision 70 for answering the request, the identification data (according to block 71) are returned to the associated switching station 2, where they are checked according to block 72.

If the check of the identity of the target station 2.1 according to block 72 is ended with a negative result, the established communication, after having generated a respective reply, will be terminated again, cf. blocks 66, 67, and once more the answer—cf. block 68—will be transmitted back to the calling switching station 1.

Otherwise, the request according to block 73 will be transmitted to the target station 2.1, whereupon the latter, according to block 74, can agree to the establishment of a communication or reject the same. The reply of the target station 2.1 is transmitted to the initiator 1.1 as well as to all the switching stations 2, 1 involved, e.g. blocks 75, 76 as well as block 77. Depending on the form of communication agreed-upon (confidentiality level, accounting information etc.) as well as on the point of time agreed upon, the respective initializations can be prepared—in case of a positive reply, block 75. The respective reply will be checked at the initiator, i.e. at the calling subscriber 1.1, according to block 78, and in a positive case, according to field 79 the readiness for a communication prevails.

In case of a negative answer, if the communication is discontinued according to block 80, the initiator 1.1 can again begin to establish a communication, cf. request 81 in FIG. 9. By respective mechanisms on the part of the responsible switching station 1, here the parameters, such as, e.g., the maximum number of communication attempts per time unit, costs per communication attempt etc., may be used for controlling purposes. If the decision at the request 81 is negative, according to field 82 the communication attempt will finally be discontinued.

In order to reach a higher level of security, it is also possible to encode all the communication steps between the communication partners involved. For this, both symmetrical methods such as, e.g., block codes (AES, IDEA etc.) and current codes (Vernam variants, SEAL 2.0 etc.) as well as asymmetrical methods, e.g. based on a central PKI, would be suitable.

Figure 10:
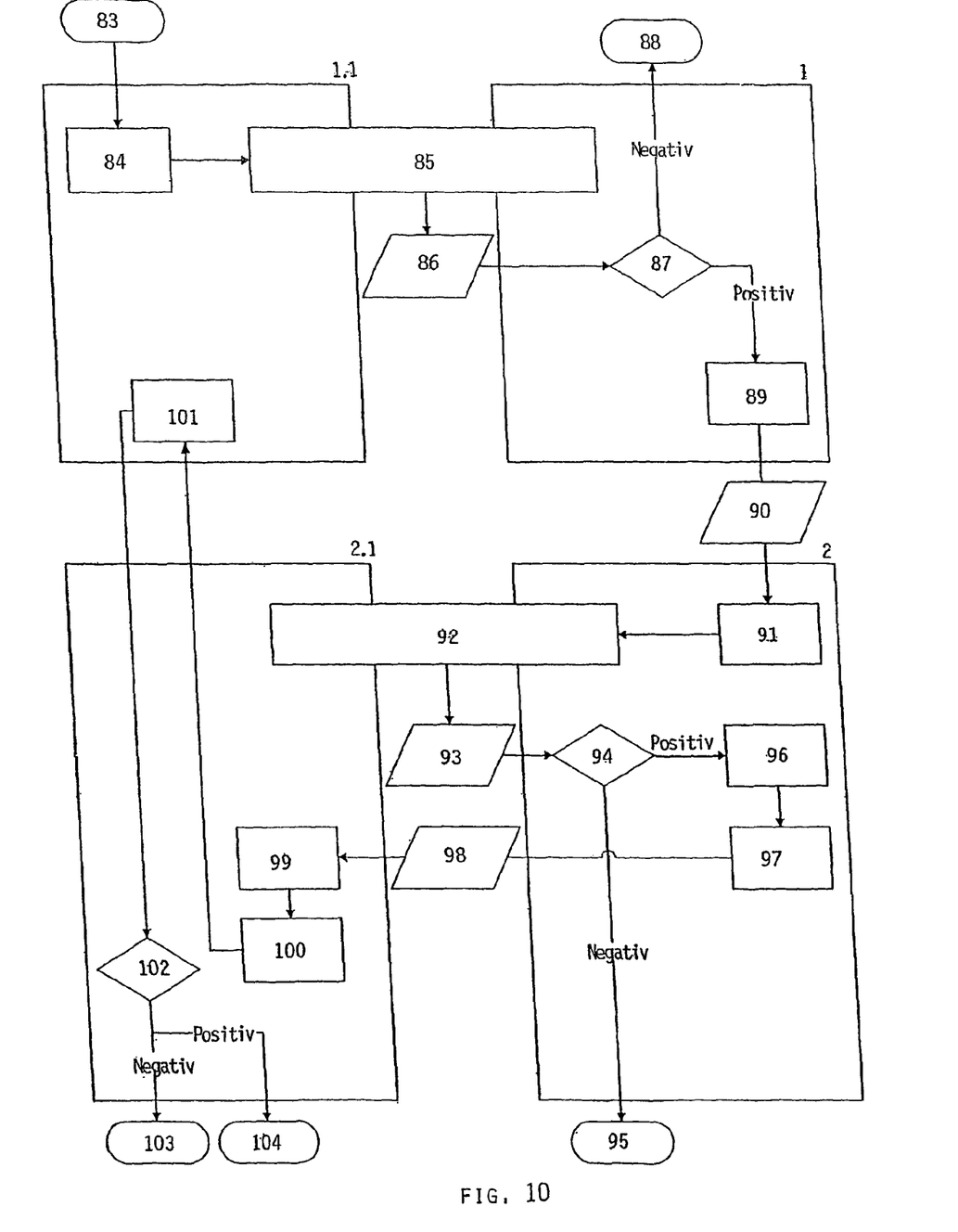
FIG. 10 shows an associated flow chart for illustrating the set-up of the secure communication therefor.

After the communication has been initialized, as described before, in the next step—cf. FIG. 10—the required key bit sequences will be generated and the communication will be established.

Together with his switching station 1, the initiator 1.1 of the communication generates a "stream 1" with agreed-upon quality criteria and a corresponding key length. In order to work with an encryption by, e.g., AES ("Announcing the Advanced Encryption Standard", Federal Information Processing Standards Publication 197, NIST) later on, a key length of 256 bits is agreed upon. In FIG. 10, following a start step 83, this is illustrated by the blocks 84 (initiation of the stream 1-generation) and 85 (stream 1-generation).

In the next step, the status of the generation (cf. block 86) is checked (block 87). A negative status will lead to a discontinuation of the communication, cf. field 88.

If the status of the generation is a positive one, the generated stream 1 will be encoded—according to block 89—by the switching station 1 of the initiator 1.1. Encoding of the stream 1 may, e.g., be effected by symmetrical methods, such as AES, or by asymmetrical methods.

After having received the encoded stream 1 (cf block 90), the switching station 2 of the target station 2.1 according to block 91 initiates the generation of the second key bit sequence (stream 2) with the target station 2.1, cf. block 92. Also here, respective quality criteria could be agreed upon, the length, e.g., could correspond to the length of stream 1, depending on the method chosen later on. Subsequently, the status (cf. block 93) is checked (block 94). In case of a negative status, the communication is discontinued, cf. field 95.

In case of a positive status, the encoded stream 1 will be decoded in the next step (block 96), and subsequently encoded with the generated stream 2 to give the third key bit sequence—stream 3, cf. block 97. An example of an encryption would be the transmissionless addition (XOR operation) of the two streams 1 and 2. For this purpose, it is necessary that both streams 1 and 2 have the same lengths and meet quality criteria defined beforehand.

According to block 98, the stream 3 generated in this manner is transferred to the target station 2.1 and is decoded again there with the stream 2, cf. block 99. The result of decoding (stream 1) will be termed "session key" hereinafter, and according to block 100 it is used as key when establishing the connection.

The target station 2.1 now starts the connection establishment with the initiator 1.1, cf. block 100, and the latter takes up the communication, cf. block 101. For this, again algorithms such as AES or IDEA may be used. Subsequently, the connection established is checked, cf. block 102. If this check of the communication yields a negative result, the communication is discontinued, at a positive result, the communication is secure as defined by this method, cf. (field 103) field 104, and the communication can occur, using the session key (stream 1).

After a discontinuation of the communication, all the respective communication partners involved in the communication will receive a respective report. The system provider may define the further procedure in case of a discontinuation, repeating, e.g., unsuccessful steps. Whether or not a repetition is possible could also depend on the conditions of the communication set-up agreed upon in the first step; for this, also the point of time of the beginning of the communication agreed upon could be relevant.

Figure 11:
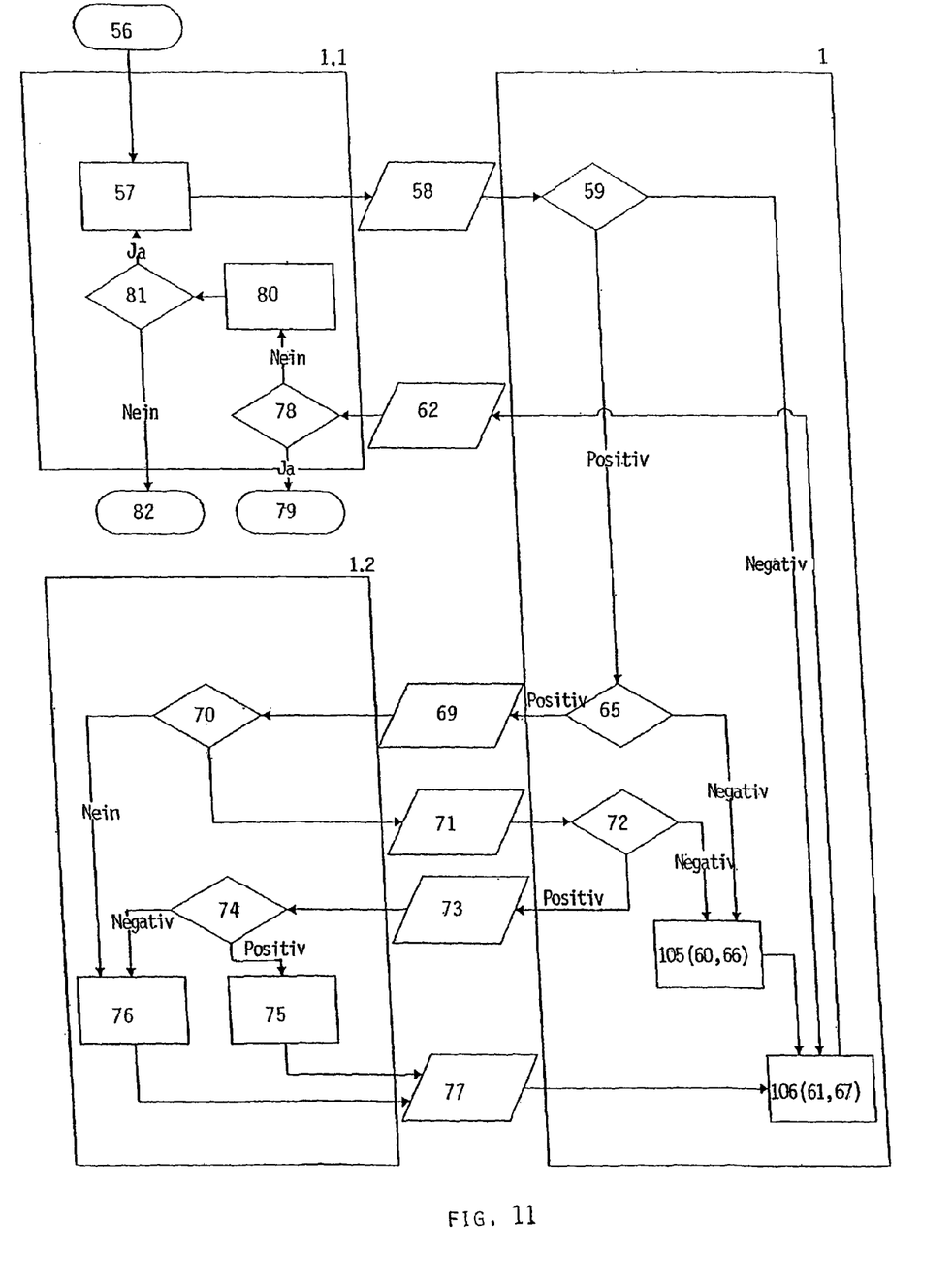
FIG. 11, for the sake of completeness, shows a flow chart for illustrating the procedures at a request for a communication set-up if only one switching station is involved.

As has been mentioned, FIGS. 11 and 12 again relate to the instance in which the called subscriber station, here 1.2, is associated to the same switching station 1 as the calling subscriber station 1.1. When looking at the individual steps in the sequence regarding the request to communicate (cf. FIG. 11 as compared to FIG. 9), it can be seen that different steps regarding the data transmission between the switching stations 1 and 2 can be omitted in FIG. 11 in comparison with FIG. 9, such as particularly the blocks 59', 63, 64 and 68 of FIG. 9. Checking of the data of the target station 1.2 is effected only once, cf. block 65, just as a discontinuation of the communication also is provided for only once—according to block 105, i.e. block 105 in FIG. 11 corresponds to the combination of blocks 60 and 66 in FIG. 9; similar facts hold for the provision of the respective reply according to block 106 in FIG. 11 which corresponds to the combination of the blocks 61 and 67 in FIG. 9. Otherwise, the sequence is the same as in FIG. 9 so that no further explanations of FIG. 11 are required in order to avoid repetitions.

Figure 12:
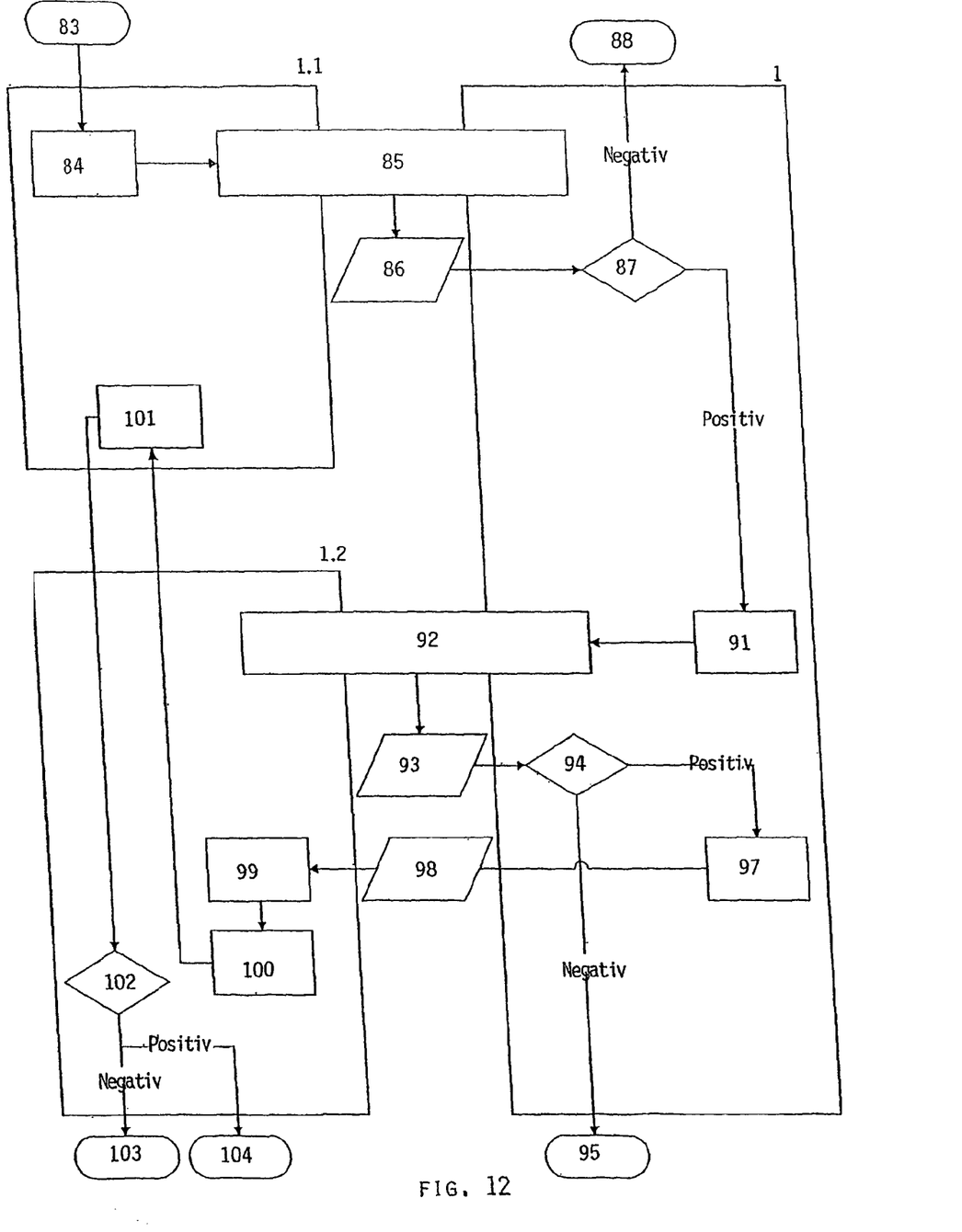
FIG. 12 shows the flow chart associated to FIG. 11 for illustrating the set-up of the secure communication, if only one switching station is involved.

Similarly, the above applies to the illustration in FIG. 12 as compared to that of FIG. 10, regarding the establishment of the secure communication, in which, due to the treatment within one and the same switching station 1, in FIG. 12 the blocks 89 and 90 illustrated in FIG. 10 and regarding the encoding of stream 1 and its transmission to the further switching station are omitted. Consequently, also decoding of the first stream according to block 96 in FIG. 10 is omitted in the sequence of FIG. 12, and there the first stream 1 can be encoded immediately with the second stream 2 to give stream 3, cf. blocks 97 and 98.

Figure 13:
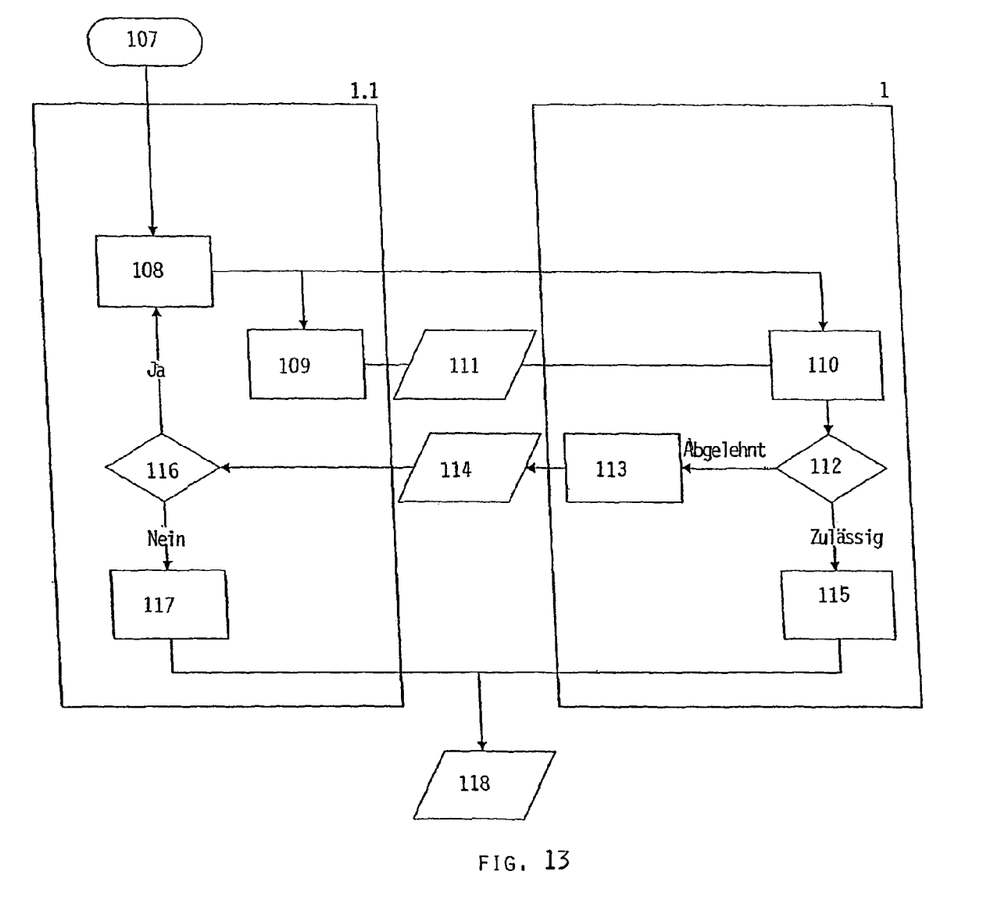
FIG. 13 shows a flow chart for illustrating the generation of a key bit sequence between a subscriber station and a switching station.

Finally, by way of FIG. 13 the procedure when generating a key bit sequence, a "stream", shall be explained in more detail. Here, following a starting step 107, the initiator, i.e. the calling subscriber station, i.e. subscriber 1.1 e.g., at the beginning of the generation makes a corresponding request, cf. block 108 in FIG. 13. This request may contain different tokens, such as, e.g., the length of the stream to be generated, the quality criteria of the stream, such as, e.g., FIPS 140-2 (cf. "Security Requirements for Cryptographic Modules", Federal Information Processing Standards Publication, pp. 140-2, NIST), criteria according to Golomb (cf. A. J. Menezes, P. c. van Oorschot, S. A. Vanstone; "Handbook of Applied Cryptography"; CRC Press 1996; p. 180 ff.), linear complexity (cf. A. J. Menezes, P. c. van Oorschot, S. A. Vanstone; "Handbook of Applied Cryptography"; CRC Press 1996; p. 198 ff.) etc.

The request is transmitted to both communication partners involved and serves to initiate appropriate steps, such as preparing the system (adjusting, self-test, etc.), recording etc.

The generation of the stream—cf. blocks 109, 110—is effected between the communication partners involved, i.e. between the initiator 1.1 and the switching station 1, e.g., by a respective protocol, such as, e.g., the protocols by Bennett and Brassard (cf. C. H. Bennett, F. Bessette, G. Brassard, L. Salvail, J. Smolin, "Experimental Quantum Cryptography", J. Cryptology (1992) 5; pp. 3-28). When a stream of the agreed-upon length has been generated—cf. also block 111—the stream is checked by one of the communication partners involved, e.g. by the switching station 1, according to block 112. Within the scope of this check, the quality criteria previously defined in the request can be checked. If the generated stream is denied within the scope of the check, a respective error report is generated (block 113) and sent to the second communication partner—here the initiator 1.1—cf. block 114.

If the stream is assessed as allowable during the check, a positive status report is generated according to block 115. The latter confirms that both communication partners now have a key which they have generated together.

On the other hand, after an error report, it may be open to the initiator to start a further attempt at generating a key, cf. block 116. Here, the system provider could intervene in a controlling manner, e.g. by allowing only a certain number of attempts per time unit, by billing each attempt individually etc. If the attempt is not repeated, a negative status report is generated according to block 117, confirming that a common key could not be generated.

The final status is illustrated by block 118 in FIG. 13 and determines the further course (encoded communication, or discontinuation).

The invention claimed is:

1. A communication system using quantum cryptography comprising:
   subscriber stations connected to one or more quantum channels;
   one or more quantum-cryptographic device associated with the one or more quantum channels for generating a quantum key during use; and
   two or more interconnected switching stations that, during use, communicate via first public lines, using encryption agreed upon, without quantum-cryptographic key exchange;
   wherein, during use, the subscriber stations are connected to the switching stations via the one or more quantum channels that generate a respective temporary quantum key and are adapted to communicate via second public lines using the quantum key, and wherein the first public lines are distinct from the second public lines, and are a priori secure lines to transmit the generated quantum key from one switching station to another and to another subscriber station;

wherein the subscriber stations involved in a given communication generate a separate key bit sequence with their associated switching station via the quantum channel after a request for a communication has been transmitted via a respective switching station during use; and wherein, during use, a switching station associated with a called subscriber station generates a third key bit sequence from the key bit sequences generated via the quantum channels and transmits this third key bit sequence to the called subscriber station which, using the key bit sequence known to it and generated by it together with the associated switching station, from the third key bit sequence generates the key bit sequence generated on the part of the calling subscriber station, which then finally is used as a mutual key for the communication between the subscriber stations.

2. The communication system of claim 1, wherein the switching stations comprise a source of photons as the quantum-cryptographic device.

3. The communication system of claim 2, wherein the switching stations further comprise a photon detector.

4. The communication system of claim 2, wherein the subscriber stations comprise a photon detector.

5. The communication system of claim 1, wherein the switching stations are interconnected at least partially by point-to-point links.

6. The communication system of claim 1, wherein the switching stations are at least partially hierarchically interconnected.

7. The communication system of claim 1, wherein, during use, quantum keys generated for a given communication are discarded at the end of the communication.

8. The communication system of claim 1, wherein, during use, generated quantum keys are monitored for interference, and if interference that might suggest eavesdropping is detected, the communication is disrupted and the keys discarded.

9. The communication system of claim 1, wherein, during use, authentication data transmitted between the switching stations are checked by the switching stations prior to the establishment of a communication between subscriber stations.

* * * * *